Patented Dec. 23, 1924.

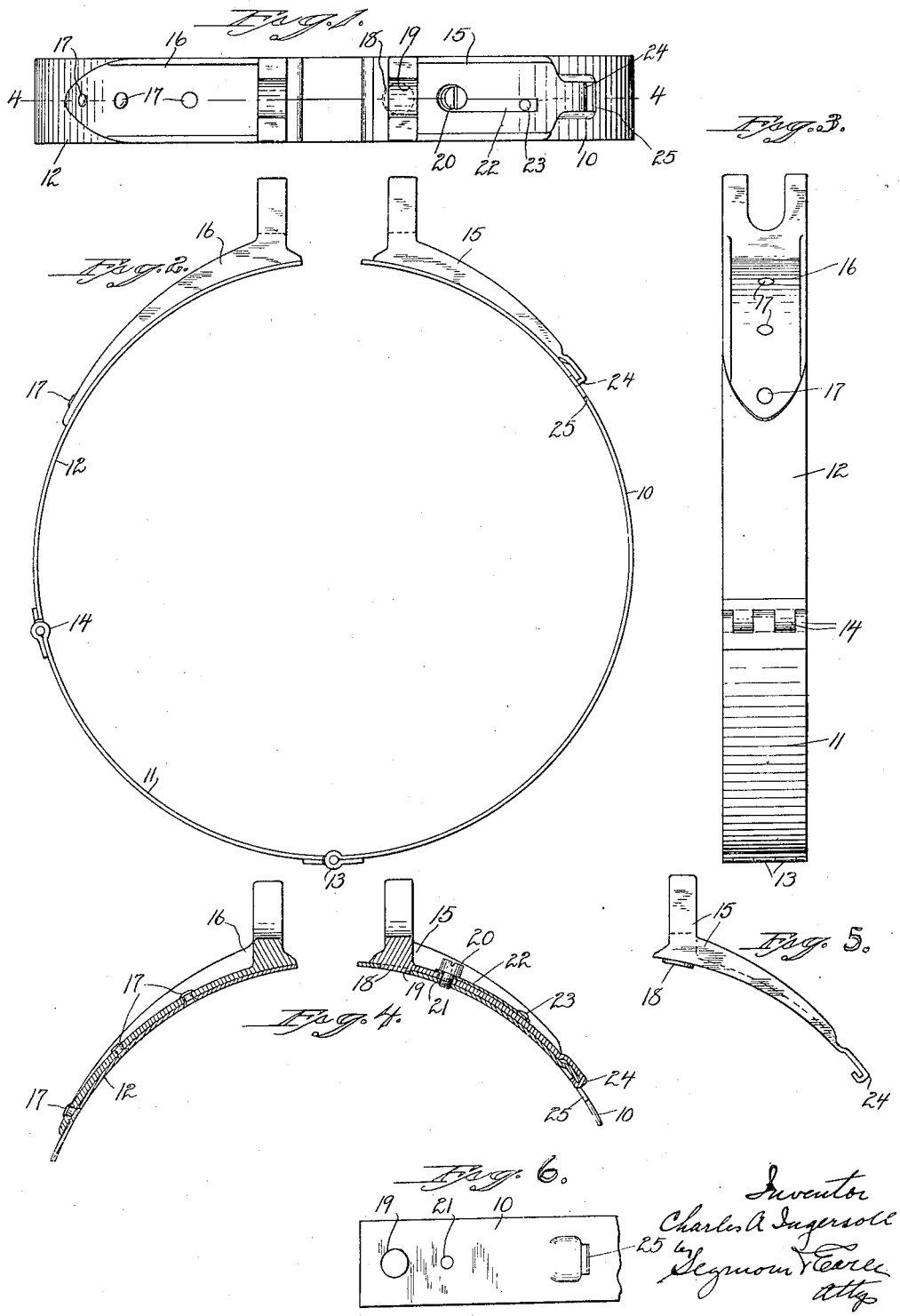

1,520,497

UNITED STATES PATENT OFFICE.

CHARLES A. INGERSOLL, OF PORTLAND, CONNECTICUT, ASSIGNOR TO RUSSELL MFG. CO., OF MIDDLETOWN, CONNECTICUT, A CORPORATION.

TRANSMISSION BAND FOR FORD CARS.

Application filed November 6, 1923. Serial No. 673,051.

*To all whom it may concern:*

Be it known that I, CHARLES A. INGERSOLL, a citizen of the United States, residing at Portland, in the county of Middlesex and State of Connecticut, have invented a new and useful Improvement in Transmission Bands for Ford Cars; and I do hereby declare the following, when taken in connection with the accompanying drawings and the characters of reference marked thereon, to be a full, clear, and exact description of the same, and which said drawings constitute part of this application, and represent, in—

Fig. 1 a plan view of a transmission-band for Ford cars, constructed in accordance with my invention.

Fig. 2 a face view thereof.

Fig. 3 an edge view thereof.

Fig. 4 a broken, sectional view thereof on the line 4—4 of Fig. 1.

Fig. 5 a detached view in side elevation of the removable clamping-lug.

Fig. 6 a broken plan view of the major band-segment to which the lug is removably applied.

My invention relates to an improvement in transmission-bands for Ford cars, the object being to produce a simple, reliable and durable band constructed with particular reference to adapting it to be introduced into the transmission casing around a drum therein without demounting the transmission-structure and removing the casing from it.

With these ends in view, my invention consists in a multiple-segment transmission-band for Ford cars, characterized by having one rigid, substantially semi-circular major-segment and a plurality of shorter segments, the combined length of which latter is equal to the length of the said major-segment, the several segments being permanently united by hinges and furnished with two clamping-lugs, that upon the free end of the substantially semi-circular or major-segment being removable.

In carrying out my invention, as herein shown, I employ a rigid, substantially semi-circular major-segment 10 substantially corresponding in curvature to the curvature of the transmission-drums of a standard Ford car. With such a major-segment 10 I employ, as herein shown, two shorter segments 11 and 12, the combined length of which latter is equal to the length of the said major-segment 10. The said segment 11 is permanently connected at its inner end to the inner end of the major-segment 10 by a hinge 13, while the inner end of the said segment 12 is permanently connected by a hinge 14 to the outer end of the segment 11. The outer, or free, end of the substantially semi-circular major-segment 10 is provided with a removable clamping-lug 15, while the corresponding end of the shorter segment 12 is provided with a complementary clamping-lug 16 permanently attached to the segment by rivets 17. The removable clamping-lug 15 is formed at its outer end with a relatively large but short integral stud 18, which fits into a corresponding circular bearing-hole 19 near the extreme outer end of the major segment 10, to which the lug 15 is fastened by means of a screw 20 entering a threaded screw-hole 21 located adjacent to the bearing-hole 19, the said screw being carried by a spring-carrier 22 secured by a rivet 23 to the lug toward the inner end thereof. The inner end of the said lug is reduced in diameter and shaped to form an inwardly-turned mounting-hook 24 which is hooked into a coupling-slot 25 formed by transversely-cutting and outwardly upsetting the band 10, as clearly shown in Fig. 7.

In the use of the band, the main draft upon the lug 15 devolves upon its stud 18, which is adapted, on account of its size, to effectively resist and carry the shearing strain of the draft, while the tendency of the lug to rock or tilt upon the band is easily borne by the engagement of its hook 24 in the slot 25. No actual strain to speak of falls upon the fastening-screw 20.

In installing my improved transmission-band without demounting the transmission-structure, the lug 15 is removed from the major segment 10, after which the three-part band is inserted, with its stripped major segment 10 foremost, into the transmission casing, from which the cover has been previously removed.

The articulation of the three segments by the hinges 13 and 14 enables the band to be folded and worked so as to be inserted into the casing, around one of the drums therein, whether that be one of the transmission-drums or the brake-drum. At the end of the operation, the stripped outer end of the part 10 is brought into position and exposed, so that its removable clamping-lug 15 may be installed upon it through the opening formed by the removal of the cover of the casing.

By employing, in the construction of my improved multiple-segment transmission-band for Ford cars, a substantially semi-circular major-segment substantially corresponding in curvature to the curvature of a standard transmission-drum, I am enabled to "negotiate" the installation of the band through the hand-hole of the transmission-casing, with the minimum amount of manipulation and hence of time and labor, inasmuch as the said segment being substantially rigid and free from hinges, follows the curvature of the drum and clears the transmission-casing, as it would not readily do if broken in its length by one or more hinges. I am thus enabled to insert 50% of the complete band into the casing with the utmost ease. Fifty per cent of the band having been introduced in the manner described, the "negotiation" of the introduction of the remaining two segments, forming the other half of the band, follows with comparative ease.

I am aware that prior to my invention, multiple-segment transmission-bands permanently connected by hinges and provided with two lugs, one of which was removable, are old, and do not claim such a construction broadly, my invention being characterized by a multiple-segment transmission-band, the segment having the removable lug being rigid and substantially semi-circular and substantially corresponding in curvature to the curvature of a transmission-drum of a standard Ford car, and the other half of the band being composed of a plurality of hinged segments adapted to be flexed to enter the housing, without being sprung and deformed.

I claim:

In a multiple-segment transmission-band, the combination with a rigid, substantially semi-circular major-segment substantially corresponding in curvature to the curvature of a transmission-drum of a standard Ford car, of a plurality of shorter segments, the combined length of which is equal to the length of the said major-segment, hinges permanently uniting the said segments, save at the outer end of the said semi-circular segment and the end adjacent thereto of one of the shorter segments, and two removable clamping-lugs, of which the lug applied to the outer end of the substantially semi-circular major-segment is removable.

In testimony whereof, I have signed this specification in the presence of two subscribing witnesses.

CHARLES A. INGERSOLL.

Witnesses:
H. M. KELSEY,
F. C. FAGAN.